(12) United States Patent
Hill et al.

(10) Patent No.: US 9,988,935 B2
(45) Date of Patent: Jun. 5, 2018

(54) GAS TURBINE ENGINE WITH AXIAL COMPRESSOR WITH INTERNAL COOLING PATHWAYS

(71) Applicant: United Technologies Corporation, Hartford, CT (US)

(72) Inventors: James Hill, Tolland, CT (US); Brian Merry, Andover, CT (US); Gabriel Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 232 days.

(21) Appl. No.: 14/788,089

(22) Filed: Jun. 30, 2015

(65) Prior Publication Data

US 2016/0032767 A1    Feb. 4, 2016

Related U.S. Application Data

(60) Provisional application No. 62/031,649, filed on Jul. 31, 2014.

(51) Int. Cl.
| | | |
|---|---|---|
| *F01D 25/14* | (2006.01) | |
| *F02C 7/18* | (2006.01) | |
| *F01D 5/08* | (2006.01) | |
| *F02C 7/12* | (2006.01) | |
| *F04D 29/32* | (2006.01) | |
| *F04D 29/58* | (2006.01) | |

(52) U.S. Cl.
CPC ............. *F01D 25/14* (2013.01); *F01D 5/084* (2013.01); *F02C 7/12* (2013.01); *F02C 7/18* (2013.01); *F04D 29/321* (2013.01); *F04D 29/584* (2013.01); *Y02T 50/673* (2013.01); *Y02T 50/676* (2013.01)

(58) Field of Classification Search
CPC .......... F01D 5/084; F01D 5/085; F01D 25/12; F01D 25/14; F02C 7/12; F04D 29/584; F05D 2260/205; F05D 2260/221
See application file for complete search history.

(56) References Cited

U.S. PATENT DOCUMENTS

| | | |
|---|---|---|
| 4,795,307 A | 1/1989 | Liebl |
| 2013/0108413 A1* | 5/2013 | Suciu ................. F01D 11/006 415/115 |
| 2013/0108466 A1 | 5/2013 | Suciu et al. |

OTHER PUBLICATIONS

Extended European Search Report dated Dec. 21, 2015 in European Application No. 15178640.7.

* cited by examiner

*Primary Examiner* — Woody Lee, Jr.
*Assistant Examiner* — Brian O Peters
(74) *Attorney, Agent, or Firm* — Snell & Wilmer L.L.P.

(57) ABSTRACT

A gas turbine engine may include an axial high pressure compressor having an air flow pathway positioned between the inner and outer rim of the rotor section. The air flow pathway includes an inlet port, a transition segment, an axial segment, and an outlet port. The pathway may be a tube having an ovoid cross sectional shape and is substantially co-planar to the outer surface of the outer rim. The pathway may traverse the rotor section from the first rotor segment to the rear hub.

19 Claims, 4 Drawing Sheets

GAS TURBINE ENGINE WITH AXIAL COMPRESSOR WITH INTERNAL COOLING PATHWAYS

CROSS-REFERENCE TO RELATED APPLICATIONS

This application is a nonprovisional of, and claims priority to, and the benefit of U.S. Provisional Application No. 62/031,649, entitled "GAS TURBINE ENGINE WITH AXIAL COMPRESSOR WITH INTERNAL COOLING PATHWAYS," filed on Jul. 31, 2014, which is hereby incorporated by reference in its entirety.

FIELD

The present disclosure relates generally to axial compressor portions of gas turbine engines and more specifically, to axial compressors having internal cooling passages.

BACKGROUND

Gas turbine engines generally include a compressor, such as an axial compressor, to pressurize inflowing air. Axial compressors may include number of rotor segments adjacent and coupled to each other in the axial direction. As the compressor operates, air temperature increases along the rotors in the aft direction. Cooling of the inner rim may tend to prevent fatigue and potentially extend the life of the material of the rims. Directed and/or bleeding cooler air to the inner rim may improve performance and extend the life of the inner rim.

SUMMARY

A gas turbine engine rotor assembly according to an embodiment may comprise a first rotor segment comprising an inner rim and an outer rim, and an air inlet port in fluid communication with a pathway, wherein the port is disposed on an outer surface of the outer rim, and wherein the pathway is disposed in the first rotor segment and a second rotor segment. The first rotor segment may be a spacer. The second rotor segment may comprise a multiplicity of rotor blades. The pathway may be a tube having an ovoid cross sectional shape. The port may comprise an opening in the outer surface of the outer rim having an ovoid cross sectional shape. The pathway may include a transition segment adjacent and in fluid communication with the port and an axial segment that is substantially co-planar to the outer surface of the outer rim. The assembly may comprise a plurality of ports each in fluid communication with a corresponding pathway. The assembly may include a third rotor segment, wherein the pathway traverses the first rotor segment, the second rotor segment, and the third rotor segment, as well as a rear hub. The pathway may include an outlet port disposed within the rear hub.

A gas turbine engine according to an embodiment may comprise an axial high pressure compressor comprising a first rotor segment and a rear hub, wherein the first rotor segment comprising an inner rim and an outer rim and an air inlet port in fluid communication with a pathway, wherein the port is disposed on an outer surface of the outer rim, and wherein the pathway is disposed in the first rotor segment and the rear hub. The first rotor segment may be a spacer. A second rotor segment may comprise a multiplicity of rotor blades. The pathway may be a tube having an ovoid cross sectional shape. The port may comprise an opening in the outer surface of the outer rim having an ovoid cross sectional shape. The pathway may include a transition segment adjacent and in fluid communication with the port and an axial segment that is substantially co-planar to the outer surface of the outer rim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "forward" and/or "fore" refers to the direction associated with the nose of an aircraft, or generally, to the direction of flight or motion.

Gas turbine engines often include a compressor, such as an axial compressor. Such axial compressors may comprise a rotor assembly. The rotor assembly includes an inner and outer rim. As the compressor operates the temperature of the inner and outer rims increases significantly. Further, the temperature of the rims increases along the rotor assembly in the aft direction. Cooling of the inner and outer rim may help prevent fatigue and potentially extend the life of the material of the rims.

Accordingly, it may be desirable to direct and/or bleed air to the inner rim of the rotor assembly. Air may be introduced to the inner rim by providing bleed ports in the outer rim which allow air to enter and be directed along a space between the inner and outer rims, thereby providing air to the inner rim. Such ports may be configured to minimize the impact the aerodynamics of air flowing in the aft direction. Further, directing and/or bleeding air flow along the inner rim may reduce and/or eliminate the need for secondary cooling methods further downstream, such as heat exchangers. Finally, air flow directed and/or bled through channels between the inner and outer rim may provide cooler air to a rear hub located in the aft portion of the compressor.

Figure 1:
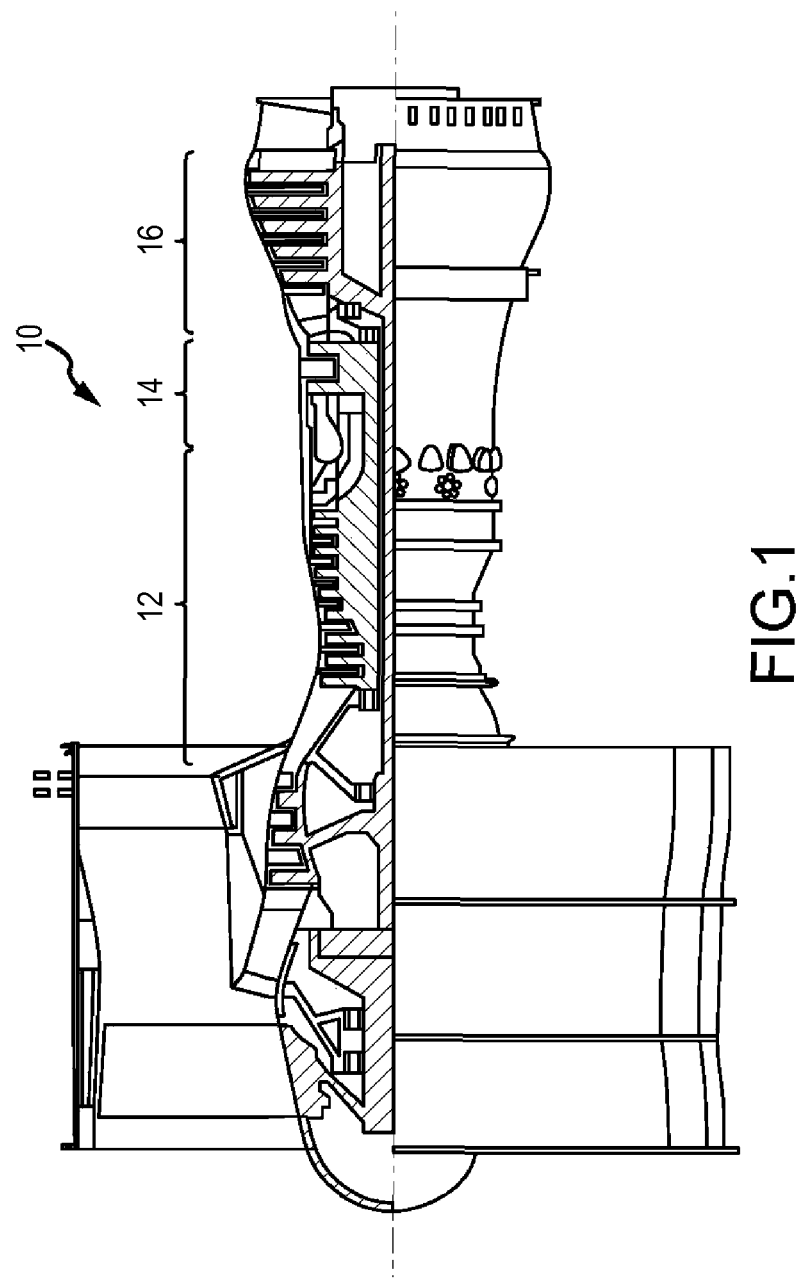
FIG. 1 illustrates, in accordance with various embodiments, a side view of a gas turbine engine.

In various embodiments, with reference to FIG. 1, a gas turbine engine 10 is shown. In general terms, gas turbine engine may comprise a compressor section 12. Air may flow through compressor section 12 and into a combustion chamber 14, where the air is mixed with a fuel source and may be ignited to produce hot combustion gasses. These hot combustion gasses may drive a series of turbine blades within a turbine section 16, which in turn drive, for example, one or more compressor section blades mechanically coupled thereto.

Figure 2A:
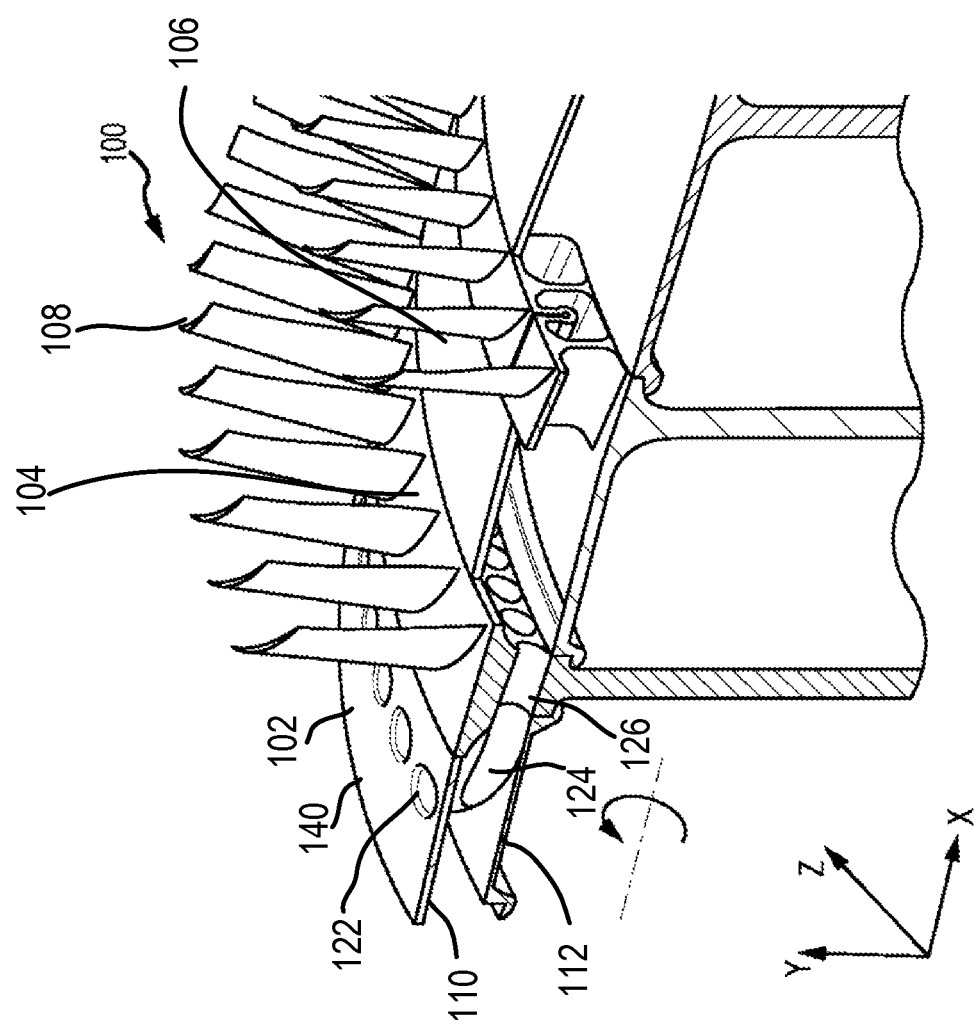
FIGS. 2A and 2B illustrate, in accordance with various embodiments, partial cross-sectional views of a compressor portion of a gas turbine engine.
Figure 2B:
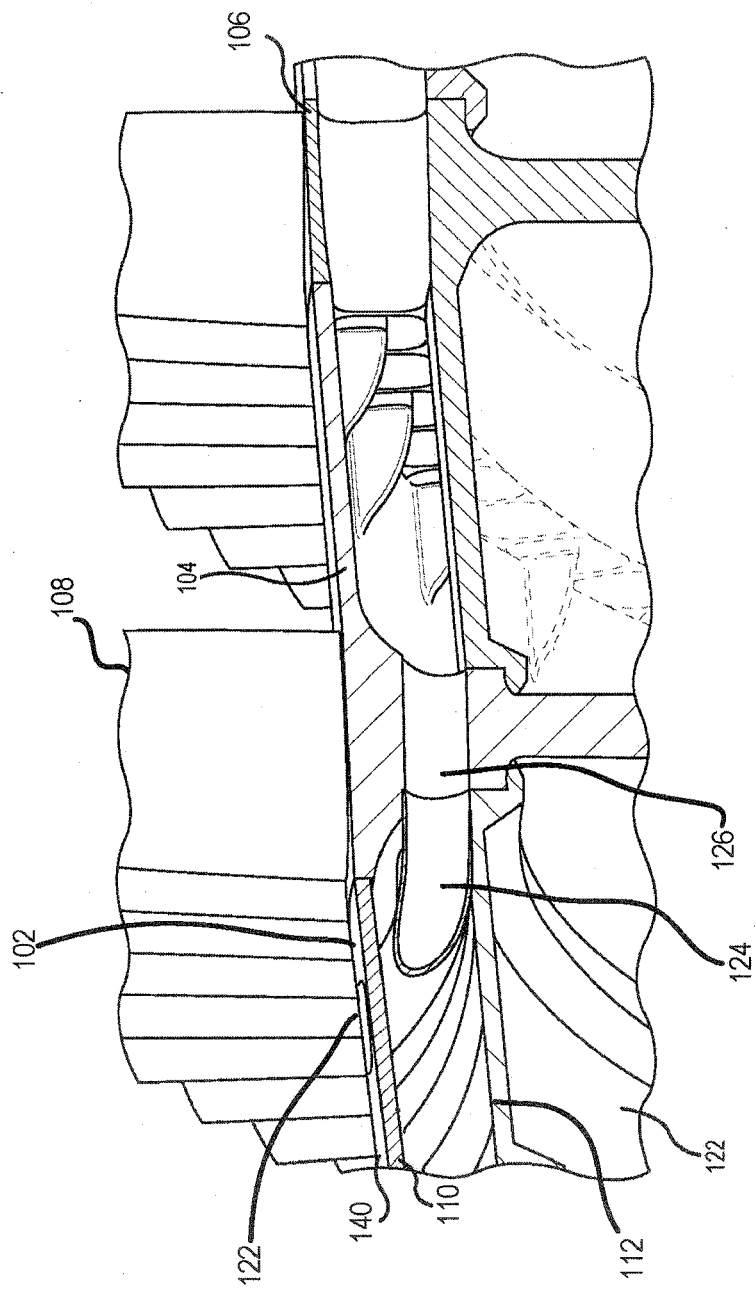

With reference to FIGS. 2A and 2B, compressor section 12 may comprise a high pressure section 100. High pressure section 100 may comprise, for example, a first rotor segment 102. In various embodiments, first rotor segment 102 may comprise an outer rim 110 and an inner rim 112. For example, first rotor segment 102 may comprise a spacer.

In various embodiments, first rotor segment 102 may comprise a pathway 120. For example, pathway 120 may comprise a channel disposed between outer rim 110 and inner rim 112. In various embodiments, pathway 120 provides a fluid channel for airflow to pass between and potentially cool outer rim 110 and inner rim 112.

Pathway 120 may comprise, for example, an air inlet port 122. In various embodiments, air inlet port 122 comprises an opening in an outer surface 140 of outer rim 110. Air inlet port 122 may, for example, have a cross sectional shape. In various embodiments, the cross sectional shape of air inlet port 122 may be round, oval, generally square, rectangular, or triangular in shape, or any other shape suitable for passing fluids from outside of the rotor segment into the interior of the rotor segment.

In various embodiments, pathway 120 further comprises a transition segment 124. Transition segment 124 may, for example, be adjacent to and in fluid communication with air inlet port 122. For example, transition segment 124 may comprise an elbow, bend, or other shape and configuration capable of changing the direction of air flow from air inlet port 122.

Further, pathway 120 may comprise an axial segment 126. In various embodiments, axial segment 126 may comprise a relatively straight air channel having any cross sectional shape. For example, axial segment 126 may be co-planer with outer surface 140 of outer rim 110.

In various embodiments, high pressure section 100 may comprise a multiplicity of ports 122 located on outer surface 140 about the circumference of outer rim 110. Each port 122 may be in fluid communication with a corresponding transition segment 124 and/or axial segment 126.

High pressure section 100 may further comprise a second rotor segment 104. In various embodiments, second rotor segment 104 comprises a blade segment having a multiplicity of blades 108. Pathway 120 may be disposed such that it traverses second rotor segment 104 between outer rim 110 and inner rim 112. Further, high pressure section 100 may comprise multiple pathways 120 such that a single pathway 120 is disposed between each blade 108 of second rotor segment 104.

In various embodiments, high pressure section 100 comprises a plurality of rotor segments, including a third rotor segment 106. Third rotor segment 106 may comprise a spacer segment, in contrast to second rotor segment 104. In various embodiments, high pressure section 100 may comprise alternating blade segments (such as second rotor segment 104) and spacer segments (such as first rotor segment 102 and/or third rotor segment 106). Pathways 120 may be configured to traverse any number of adjacent rotor segments, including all rotor segments.

Figure 3:
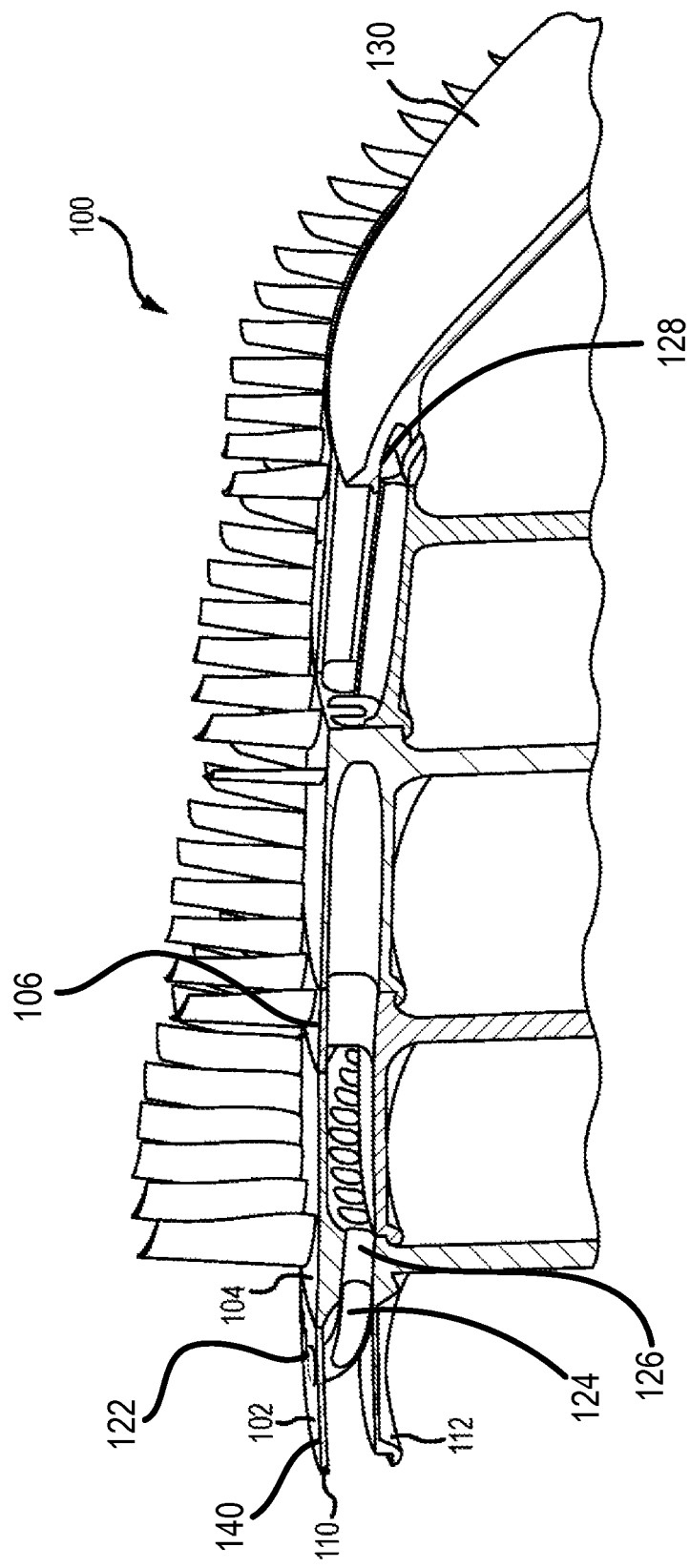
FIG. 3 illustrates, in accordance with various embodiments, a partial cross-sectional view of a compressor portion of a gas turbine engine.

With reference to FIG. 3, high pressure section 100 may further comprise a rear hub 130. In various embodiments, rear hub 130 is located downstream from first rotor segment 102, and is positioned at the aft end of high pressure section 100. Pathway 120 may further comprise, for example, an outlet port 128 disposed within rear hub 130. In various embodiments, outlet port 128 may be adjacent and in fluid communication with axial segment 126. For example, outlet port 128 may allow air that has traveled through pathway 120 to exit within rear hub 130. Outlet port 128 may be configured, shaped, and oriented to provide a particular direction and pressure of air entering rear hub 130.

Benefits, other advantages, and solutions to problems have been described herein with regard to specific embodiments. Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine rotor assembly comprising:
   a first rotor segment comprising an inner rim and an outer rim each of the inner rim and the outer rim with radially inner and outer surfaces defining a void space radially between the inner rim's outer surface and the outer rim's inner surface; and
   an air inlet port in fluid communication with a pathway, wherein the port is disposed on the outer surface of the outer rim, and wherein the pathway is disposed within the first rotor segment and a second rotor segment between the outer rim and the inner rim, wherein the pathway comprises a bounded transition segment disposed within the void space, the transition segment adjacent to and in fluid communication with the air inlet port, wherein the transition segment has an inner wall and an outer wall within the void, the transition segment having a radial section and an axial section.

2. The gas turbine engine rotor assembly of claim 1, wherein the first rotor segment is a spacer.

3. The gas turbine engine rotor assembly of claim 1, wherein the second rotor segment comprises a multiplicity of rotor blades.

4. The gas turbine engine rotor assembly of claim 1, wherein the pathway comprises a tube having an ovoid cross sectional shape.

5. The gas turbine engine rotor assembly of claim 1, wherein the port comprises an opening in the outer surface of the outer rim having an ovoid cross sectional shape.

6. The gas turbine engine rotor assembly of claim 1, wherein an axial segment of the pathway is adjacent and in fluid communication with the transition segment, and is substantially co-planar to the outer surface of the outer rim.

7. The gas turbine engine rotor assembly of claim 1, comprising a plurality of ports each in fluid communication with a corresponding pathway.

8. The gas turbine engine rotor assembly of claim 1, further comprising a rear hub adjacent and coupled to the second rotor segment.

9. The assembly of claim 8, further comprising a third rotor segment, wherein the pathway traverses the first rotor segment, the second rotor segment, and the third rotor segment.

10. The gas turbine engine rotor assembly of claim 9, wherein the pathway comprises an outlet port disposed within the rear hub.

11. A gas turbine engine comprising:
    an axial high pressure compressor comprising a first rotor segment and a rear hub, wherein the first rotor segment comprising an inner rim and an outer rim each of the inner rim and the outer rim with radially inner and outer surfaces defining a void space radially between the inner rim's outer surface and the outer rim's inner surface;
    an air inlet port in fluid communication with a pathway, wherein the port is disposed on the outer surface of the outer rim, and wherein the pathway is disposed within the first rotor segment and the rear hub between the outer rim and the inner rim, wherein the pathway comprises a bounded transition segment disposed within the void space, the transition segment adjacent to and in fluid communication with the air inlet port, wherein the transition segment has an inner wall and an outer wall within the void, the transition segment having a radial section and an axial section.

12. The gas turbine engine of claim 11, wherein the first rotor segment is a spacer.

13. The gas turbine engine of claim 11, further comprising a second rotor segment disposed between the first rotor segment and the rear hub.

14. The gas turbine engine of claim 13, wherein the second rotor segment comprises a multiplicity of rotor blades.

15. The gas turbine engine of claim 11, wherein the pathway comprises a tube having an ovoid cross sectional shape.

16. The gas turbine engine of claim 11, wherein the port comprises an opening in the outer surface of the outer rim having an ovoid cross sectional shape.

17. The gas turbine engine of claim 11, wherein the pathway comprises an axial segment adjacent and in fluid communication with the transition segment, wherein the axial segment is substantially co-planar to the outer surface of the outer rim.

18. The gas turbine engine of claim 17, wherein the pathway comprises an outlet port adjacent the axial segment and disposed within the rear hub.

19. The gas turbine engine of claim 11, comprising a plurality of ports each in fluid communication with a corresponding pathway.

* * * * *